United States Patent [19]
Rhyins et al.

[11] 3,992,623
[45] Nov. 16, 1976

[54] OPTICAL SCANNER
[75] Inventors: Richard W. Rhyins, Ridgefield; Ralph Rand, New Milford; Matthew J. Costello, Bethel; Robert E. Krallinger, New Milford, all of Conn.
[73] Assignee: Graphic Sciences, Inc., Canbury, Conn.
[22] Filed: Mar. 14, 1975
[21] Appl. No.: 558,415

[52] U.S. Cl. .............................. 250/216; 178/7.6; 250/235
[51] Int. Cl.² .......................................... H01J 3/14
[58] Field of Search ................ 178/6.8, 7.6; 350/7, 350/6, 285; 250/216, 566, 567, 568, 234, 235, 236

[56] References Cited
UNITED STATES PATENTS

| | | |
|---|---|---|
| 3,456,997 | 7/1969 | Stites et al. ...................... 250/566 |
| 3,520,586 | 7/1970 | Bousky ............................. 250/235 |
| 3,746,868 | 7/1973 | Plockl .............................. 178/7.6 |
| 3,790,246 | 2/1974 | Pickering ......................... 350/285 |
| 3,797,908 | 3/1974 | Ward et al. ...................... 350/7 |
| 3,814,495 | 6/1974 | Walter ............................. 178/7.6 |

Primary Examiner—David C. Nelms
Attorney, Agent, or Firm—Kevin R. Peterson; Robert A. Green; William B. Penn

[57] ABSTRACT

A folded retro-reflective optical scanner using common major optics for both scanning and reading and achieving a long scan line (8.25 inches) with a short throw distance and little bow. Astigmatic effects in the reading beam are minimized by utilizing only the center portion of the return beam for reading.

16 Claims, 6 Drawing Figures

OPTICAL SCANNER

BACKGROUND OF THE INVENTION

1. Field of the Invention

The invention relates to optical scanners and, more particularly, to folded optical scanners of the unidirectional flying-spot type for scanning a document line by line.

2. Prior Art

Flying spot optical scanners illuminate successive segments of a line on a document with a beam of light of small areas measured by the resulting reflectance of the document to thereby provide a signal representative of information contained in the document. Unidirectional scanners sweep the spot across the document in a single direction.

One common system for illuminating a document uses a rotating scan mirror which receives a beam of light from a stationary source and, through its own motion, converts the stationary beam to a moving beam which traverses the document being scanned. One or more lens elements are generally interposed between the scan mirror and the document being scanned in order to focus the scanning beam onto a small area. In such systems, it is deisrable to utilize a long focal length for the main lens in order to limit the angular convergence imposed on the lens (i.e. the angle through which the scanning beam must pass in illuminating the line) to thereby limit optical aberrations caused by large off-axis angles of illumination. However, long focal lengths increase the dimensions of the scanning system and this is generally undesirable.

Folded optical systems (i.e., those in which the light path is bent back on itself) are sometimes used to provide an effectively long focal length while limiting the space the system occupies. However, in such systems the scan mirror and the document cannot be so arranged that the illuminating beam remains in a plane containing the desired straight-line scan line and thus the scan line is not straight, as desired, but is instead bowed. The longer the scan line, of course, the greater the bow (departure of the actual scan line from the desired scan line).

Astigmatic effects associated with field curvature also "spread" the illuminating beam and thereby limit the resolution that can be obtained from optical systems. Further, unwanted reflections from optical elements such as lenses and mirrors frequently cause spurious inputs to the photoresponsive element.

This is especially a problem in retro-reflective optical systems, that is, those in which the reflected beam returns along the same path as the illuminating beam, since the return beam is generally of greatly diminished intensity with respect to the illuminating beam. Under these conditions, undesired reflections ("ghosts") of the illuminating beam from the surfaces of lenses or other optical elements may degrade, or even totally mask the return information-bearing beam.

BRIEF SUMMARY OF THE INVENTION

Objects of the Invention

Accordingly, it is an object of the invention to provide an improved optical scanner.

Further, it is an object of the invention to provide a folded optical scanner having a long scan line with little bow.

Another object of the invention is to provide an optical scanner having improved resolution of the reading beam.

Yet another object of the invention is to provide an optical scanner which uses the same major optics for both illumination and reading.

Still another object of the invention is to provide an improved optical scanner which limits unwanted reflections from the illuminating beam.

A further object of the invention is to provide a folded optical scanner having an image which is relatively free from astigmatism and which provides a relatively flat field.

Brief Description of the Invention

The scanner of the present invention uses a light source and a photoresponsive element which are positioned at right angles to each other. A beam splitter in the form of a mirror having a central aperture is symmetrically positioned with respect to the optical axis of the light source and the photoresponsive element. In particular, the plane of the mirror bisects the angle between the optical axes of these two elements. The illuminating beam is reflected from the beam splitter onto a scanning mirror and is further reflected by the latter through a catadioptric (combined lens and mirror) system of long focal length onto the document being scanned. The catadioptric system includes a color-correcting lens, a plane mirror, and a curved (spherical) mirror.

On reflection from the document, the returning beam (the "reading beam") returns along a similar path, that is, it is reflected from the mirrors intermediate the scanning mirror and the document, is collimated by the lens, impinges on the scanning mirror, and is thence reflected onto the beam splitter mirror. Some of the returning light passes through the central aperture in this mirror and is then focused onto the photoresponsive element; the remaining light in the reading beam is returned back toward the light source by the mirrored periphery surrounding the central aperture of the beam splitter.

The mirrors in the path intermediate the scanning mirror and the document are oriented to provide a folded optical path, that is, they are positioned to cause successive reversals of the direction of travel of the light beam with respect to the plane of the document. This allows utilization of a focusing lens of long focal length while minimizing the actual space that the optical systems occupies. Because the illuminating beam in a folded system necessarily departs from the plane containing the ideal (straight-line) scan line as it sweeps across the document, the actual scan line is normally bowed with respect to the desired (straight) scan line. In the present invention, the bow is minimized by arranging the light source, the photoresponsive element, and the beam splitter so that light leaving the beam splitter to illuminate the document, or returning to the beam splitter after illuminating the document, is oriented at an acute angle (approximately 85°, i.e. a 5° "tilt") to the scan axis of the scanning mirror, instead of being perpendicular to this axis as would normally be the case. Further, the spherical mirror is so positioned that light impinging on it strikes it at an angle of from 8° – 10° off the normal. These orientations remove most of the scan line bow.

In order to remove astigmatic effects from the reading beam, only the central portion of this beam is utilized. The central portion is most sharply defined and most free from optical aberrations, and thus its use improves the optical resolution. Removing the outer portion of the reading beam is accomplished by the beam splitter.

To accomplish this, the central aperture of the beam splitter is made elliptical in shape so that, when viewed along the optical axis of either the illuminating beam or the photoresponsive axis of either element, it appears to be circular. The beam from the illuminating element (the "illuminating beam") and the mirror size and aperture size are so arranged that the outer 50 percent of the cross-sectional area of the illuminating beam impinges on the mirror surface surrounding the aperture and is thence reflected for subsequent illumination of the document being scanned. Conversely, the central 50 percent of the illuminating beam area passes through the central aperture where it is absorbed by optically blackened surfaces and does not illuminate the document.

In a similar manner, the central 50 percent of a beam returned from the document ("the reading beam") returns through the central aperture of the beam splitter mirror and is focused into the photoresponsive surface of the photoresponsive element, while the outer 50 percent of the reading beam is reflected from the mirror surface back onto the light source. Thus, the portion of the reading beam which is most subject to undersirable astigmatic effects (the outer portion) is shielded from the photoresponsive elements, while the portion of the reading beam least distorted by astigmatic effects (the inner or central portion) is passed on to the photoresponsive element. A photosensitive switch is preferably positioned behind the beam splitter and aligned to receive illumination from the illuminating beam through the aperture so as to monitor the energization of the light source and thereby provide a check on system operation.

The document being scanned may have a diffuse or semi-diffuse reflecting surface, that is, reflections at many different angles are obtained on illumination. The illuminating beam is arranged to impinge on the document at a small off-normal angle (as measured with respect to a line in the plane of the paper and extending in its direction of travel) so that any glare (that corresponding to a pronounced specular reflection) does not return along the path of the illuminating beam. Instead, the off-normal beam of lower intensity, is returned along the illuminating beam path. Thus, overloading of the photomultiplier element by specular reflection is prevented and a more faithful reproduction of the (diffuse) document surface information is achieved.

DETAILED DESCRIPTION OF THE INVENTION

The foregoing and other and further objects and features of the invention will more readily be understood from the following detailed description of the invention, when taken in conjunction with the accompanying drawings, in which.

Figure 4:
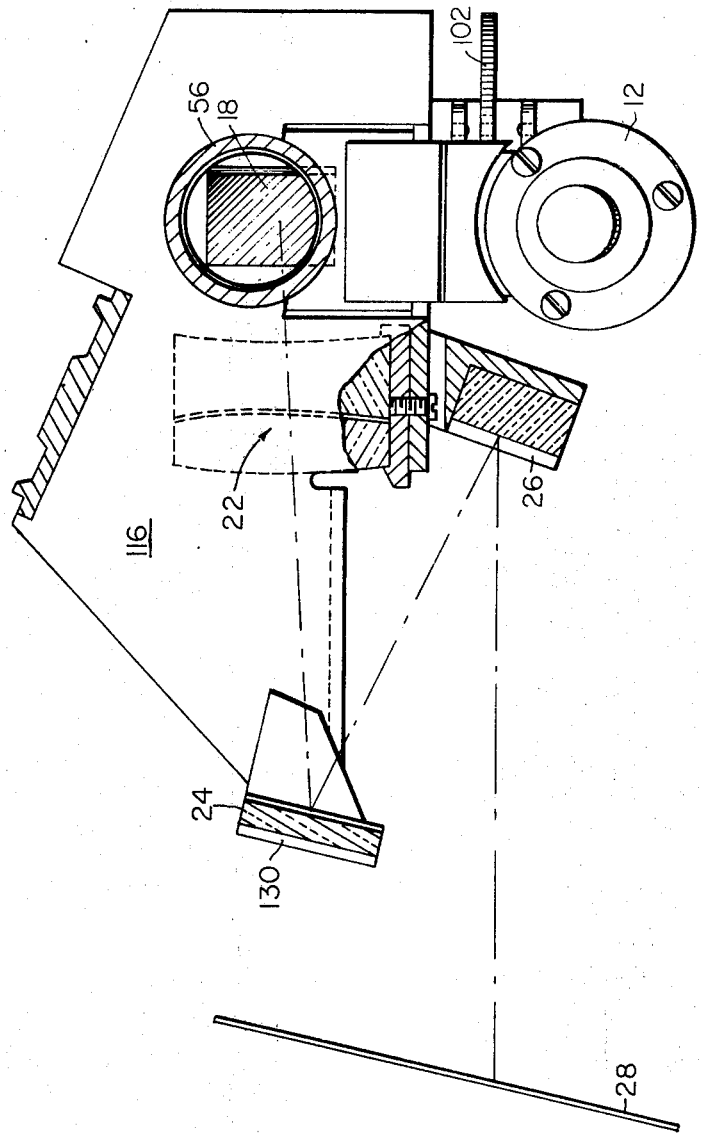
FIG. 4 is a vertical end view of the scanner taken along the lines 4—4 of FIG. 3.
Figure 5:
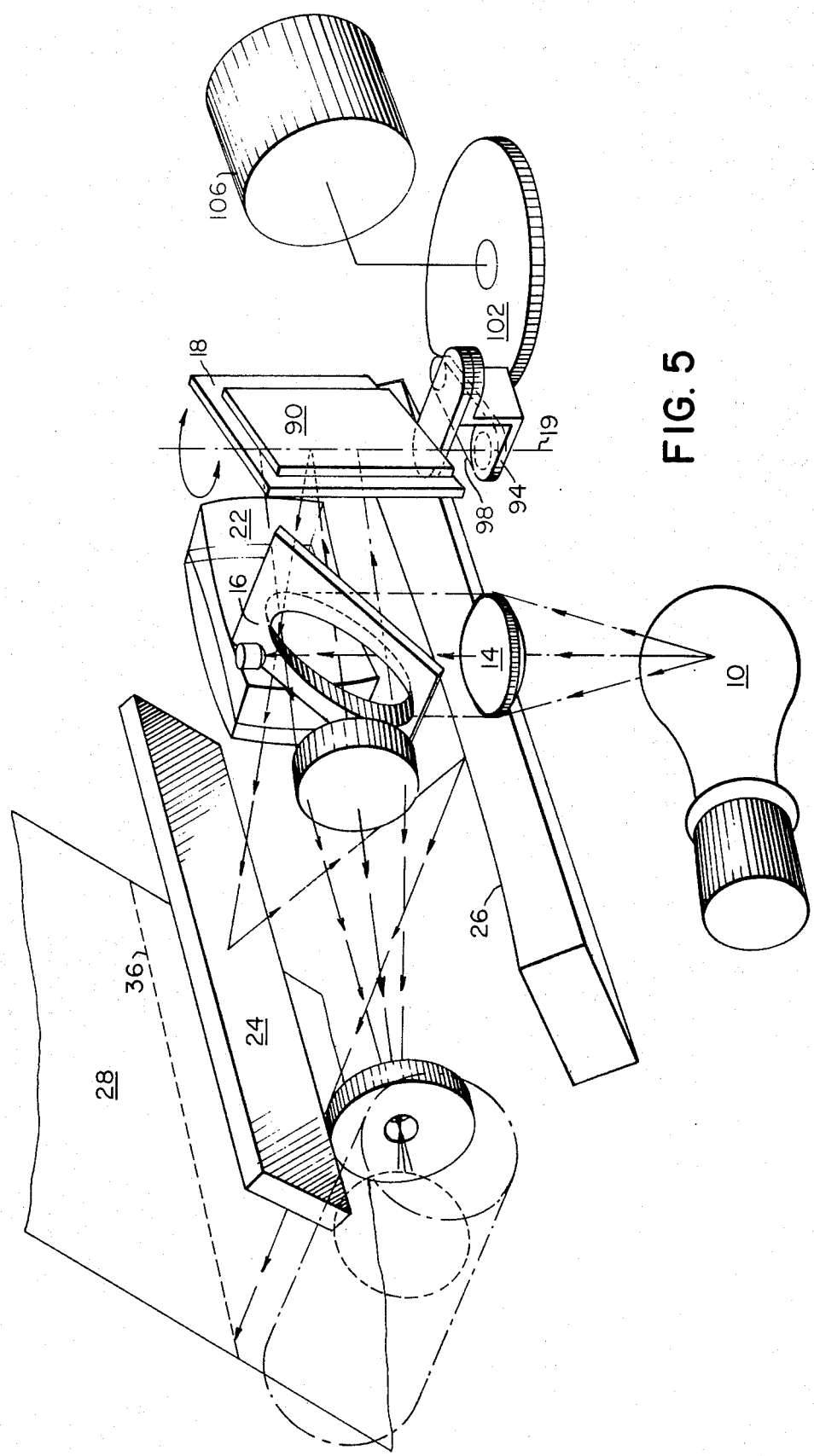
FIG. 5 is a diagramatic view, in perspective, of the scanner showing the path of some of the light rays through the scanner.

In the drawings, a light source 10 within a housing 12 projects an illuminating beam onto a collimating lens 14 and thence onto a beam splitter 16 from whence it is reflected onto a scanning mirror 18. The mirror 18 is mounted for rotation about an axis 19 defined by a shaft 20 (see FIGS. 2 and 3) which will subsequently be described in more detail. Light reflected from the mirror 18 passes through a focusing lens 22 and impinges on a plane mirror 24 from whence it is reflected (referring now to FIG. 4) onto a section of a spherical mirror 26 and thence is focused on the document 28 which is to be scanned. As the mirror 18 rotates on shaft 20, it sweeps the light beam from source 10 across the document 28 to thereby form a scan line 36 (FIG. 5).

Due to the non-perpendicular orientation of the illuminating beam to the document (see FIG. 6) only a diffusely reflected beam is returned along the path of the illuminating beam, and this beam constitutes the reading beam. The intensity of this beam is proportional to the reflectance of the document at the scanning spot and is thus indicative of information on the document at that spot. The returning reading beam impinges on the mirror 26, is in turn reflected onto the mirror 24, and is thence collimated by the lens 22 and projected onto the scanning mirror 18. The latter reflects the returning beam onto the beam splitter 16 and it passes through a central aperture in this splitter to a photoresponsive element 30 through a focusing lens 32.

Element 30 provides as output an electrical signal whose amplitude is proportional to the intensity of the reading beam and is thus indicative of the information on the document being scanned. This output may be used in any of numerous ways according to the desires of the user. In a facsimile transmission and reception system for which the present apparatus is specifically designed, the output of the photoresponsive element 30 is transmitted to a remote location where it is utilized to reproduce the contents of the document 28.

Figure 1:
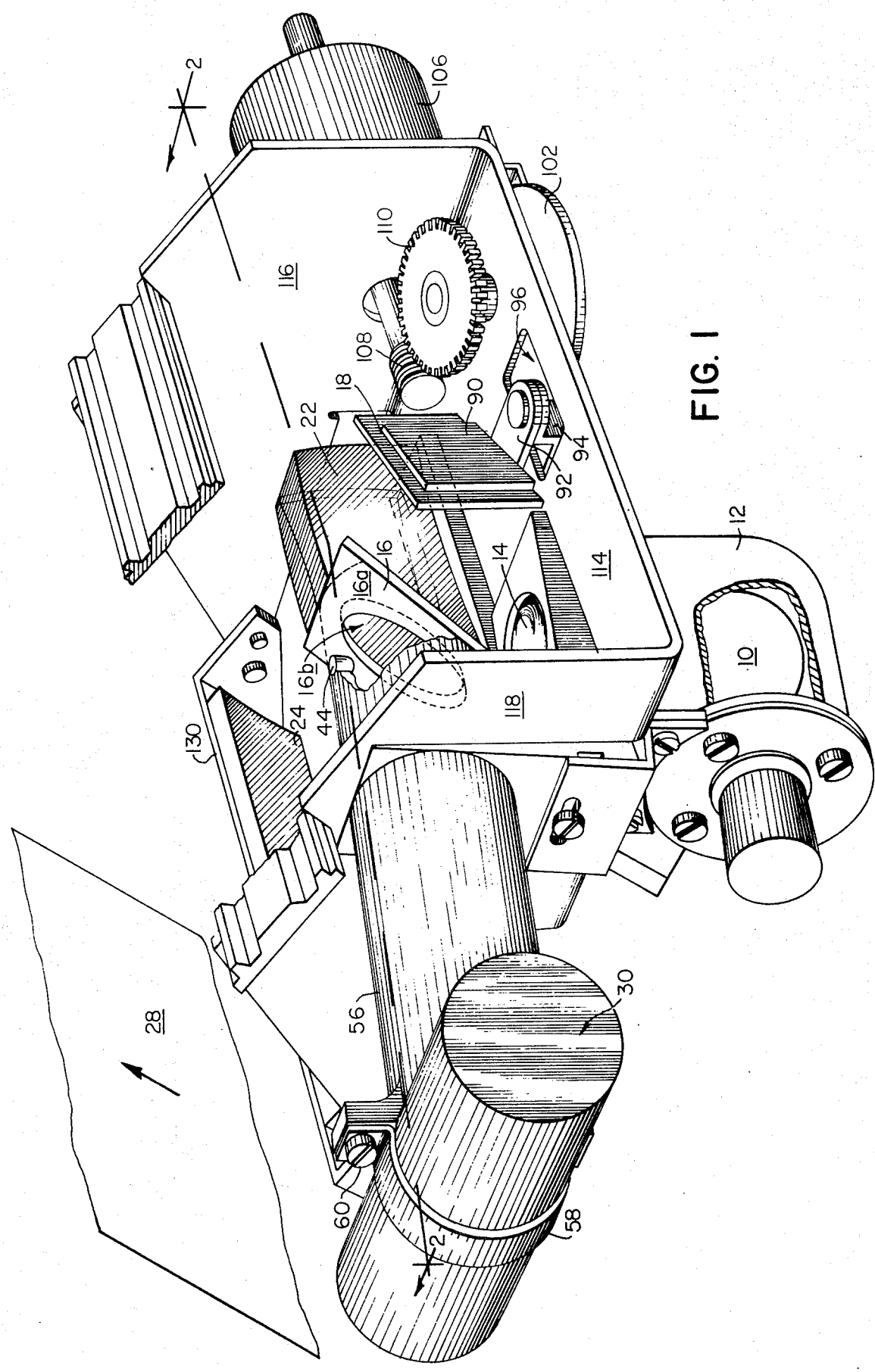
FIG. 1 is a view in perspective of an optical scanner constructed in accordance with the present invention.
Figure 2:
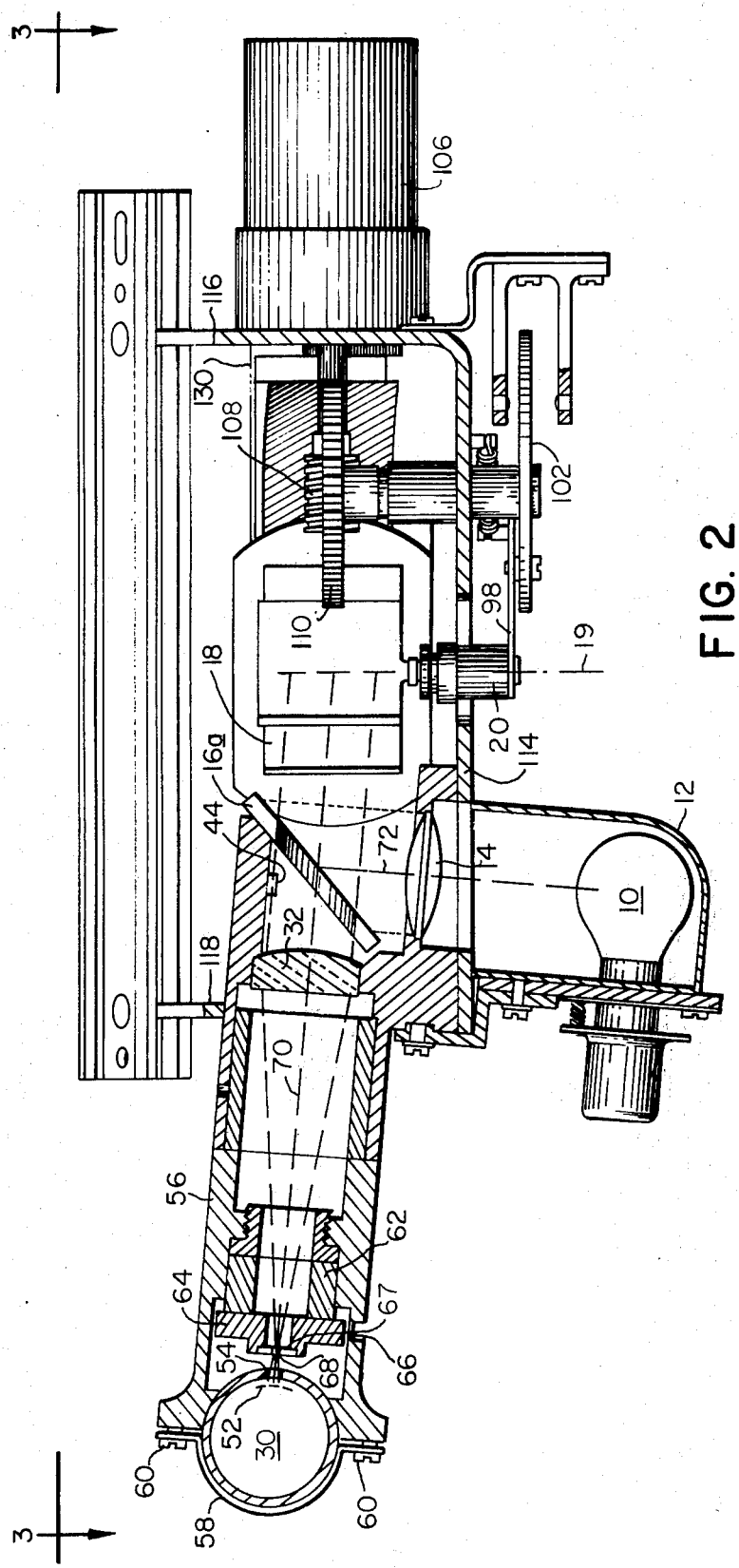
FIG. 2 is a sectional view of the scanner of FIG. 1 taken along the lines 2—2 of FIG. 1.
Figure 3:
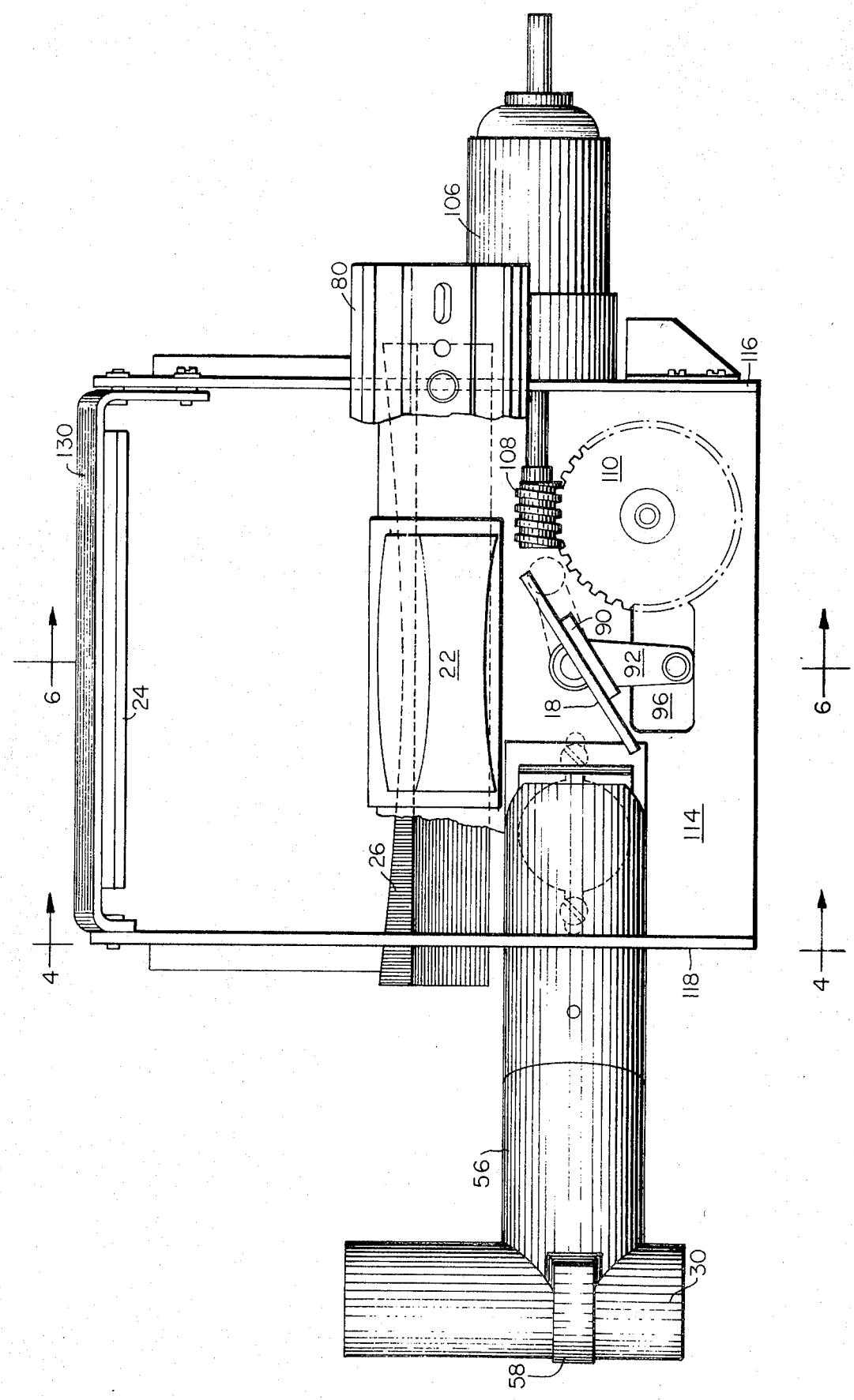
FIG. 3 is a plan view of the scanner taken along the lines 3—3 of FIG. 2.

Referring now particularly to FIGS. 1–3, the light source 10 preferably comprises a commercially available low-voltage bulb such as a General Electric Co. type 1630 having a helical filament that is preferably oriented so that axis of the helix is nearly 45° to the collimating lens 14. The lamp is energized from an appropriate source of electricity (not shown). The beam splitter 16, which is best seen in FIGS. 1 and 2, comprises a plane mirror having an outer mirrored periphery 16a presented to the scanning mirror 18 and a centrally disposed aperture 16b. The aperture is elliptical in shape and is oriented to present a circular cross-section occupying approximately 50 percent of the cross-sectional area of the illuminating beam presented to it by the lens 14. The mirrored periphery 16a occupies the remaining 50 percent of the beam. Accordingly, the outer half of the illuminating beam impinging on the beam splitter 16 is reflected from it onto the scanning mirror 18, while the inner half of this beam passes through the aperture 16b and impinges on the far wall of a housing 42 mounting the photoresponsive element 30. This wall and the adjacent surfaces are preferably blackened to prevent reflection and thus the beam impinging on it is absorbed and not passed on to any further optical component. However, a photosensitive element 44, such as a phototransistor, is mounted on the inner wall of the housing 42 in the path of the beam impinging on it from the lens 14. The phototransistor 44 provides a signal indicative of the presence or absence of light from the source 10 and thus automatically monitors the condition of this light. This provides a useful control signal to shut down the operation of the scanner or of a remote receiver when the lamp is malfunctioning.

With the beam splitter constructed as shown, only the inner cone (the central 50 percent) of the return of reading beam is passed on to the photoresponsive element 50; the outer cone, which is more subject to astigmatic effects, is blocked from this element. This contributes to formation of a well-defined image at the photoresponsive element.

The photoresponsive element 30 comprises a photomultiplier having a photosensitive element 52 positioned behind a window 54 and connected to receive light from the mirror 18 through a light tight housing 56. The phototube is advantageously an RCA-type IP21 (S4) tube. A strap 58 and screws 60 secure the tube to the barrel 56. A body 62 threaded within barrel 56 has a knurled wheel 64 to which access is provided through an aperture 66. The body 62 has a central hollow core which terminates at one end in an aperture plate 68 having a centrally defined aperture 70. Rotation of the wheel 66 moves the aperture plate toward or away from the mirror 18 and thereby allows adjustment of the position of the aperture 70 to coincide with the focal point of the return ("reading") beam from mirror 18.

The optical axis 70 of the reading beam incident on the photoresponsive element 52 is positioned perpendicular to the optical axis 72 of the illuminating beam incident on the beam splitter 16; further, these axes intersect at the center of the aperture 16b. The beam splitter 16 thus bisects the angle between the optical axes 70 and 72. Further, these axes are so oriented that the illuminating beam incident on the scan mirror 18 from the beam splitter 16 impinges on this mirror at an acute angle with respect to the scan axis 19, instead of perpendicular to it as would normally be the case. The tilt (i.e. departure from perpendicularity) is of the order of 5°. This assists in correcting the scan line bow which would normally arise from decentering (i.e. removing from a straight-line optical axis) and tilting (i.e. positioning at an angle to an optical axis) the spherical mirror to accomodate the optical system within a confined space. Further, the tilt diverts from the photomultiplier 30 undesired reflections of the illuminating beam from the surface of the lens 22.

As best seen in FIGS. 1 and 5, the scan mirror 18 is cemented to a plate 90 which is connected to an arm 92 and thence through an L-shaped arm 94 to shaft 20. An aperture 96 provides a limited amount of motion for the arm 94. A follower arm 98 fixedly attached to shaft 20 and terminating in a cam follower 100 is pressed against a cam 102 by means of a spring 104 (FIG. 2). Cam 102 is driven by a motor 106 through a worm gear 108 and its mating gear 110.

The shaft 20, cam 98, and gears 108 and 110 are mounted on a chassis 112 having a bottom horizontal wall 114 and side vertical walls 116 and 118, respectively. The front plane of the mirror 18 is positioned such that the vertical axis of the shaft 20 coincides with a line 120 vertically bisecting the mirror lying and in the mirror surface which thus forms the mirror scan axis about which the mirror pivots. The zero position of the mirror occurs when it is oriented at 45° to the optical axis 119 of the mirror 22. In this position, the illuminating beam from the beam splitter 16 is reflected by the mirror 18 onto the lens 22 in the direction parallel to the optical axis of the lens. The mirror pivots through an angle of ±12°(degrees) about its neutral position, thereby deflecting the illuminating beam through an optical angle of ±24°. This scans the illuminating beam across the document, from one side to the other.

Because of the long effective focal length of the system (250 mm), the beam is incident on the document at essentially a right angle in the horizontal plane (the plane containing the scan line). Thus, the system is essentially telecentric with respect to the mirror 18 and a constant scan rate across the document (which is important for quality scanning) is achieved simply by pivoting the mirror at a constant angular rate during the scan. This greatly simplifies the mirror drive system, and particularly the cam 102. In the embodiment illustrated herein, we drive the mirror at a scan rate of from 2 to 5 Hz. The cam is contoured to provide a quick return, during which time the output of the photomultiplier 30 is blanked.

Figure 6:
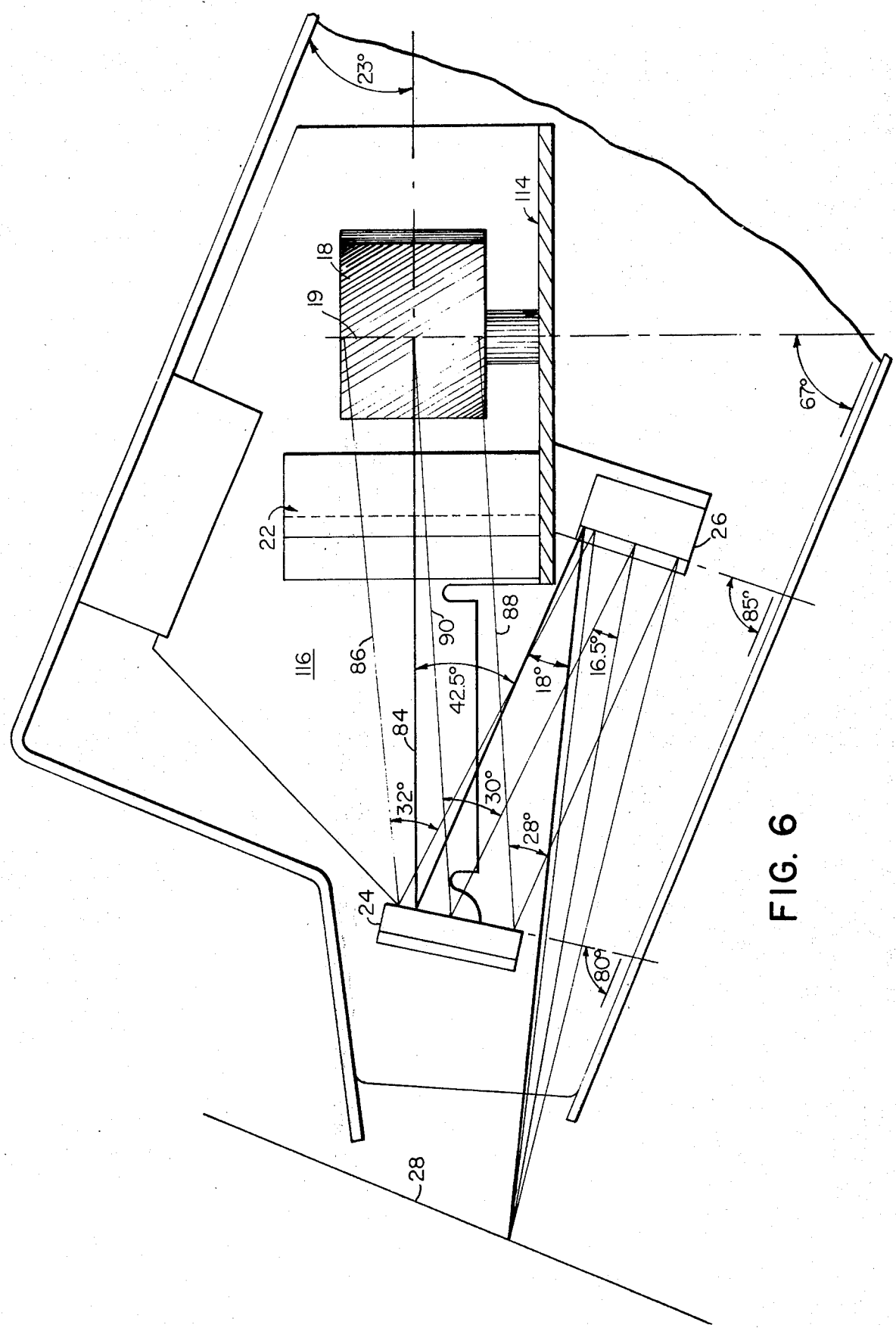
FIG. 6 is a vertical end view of the scanner along the lines 6—6 of FIG. 3 and showing the paths of some of the illuminating and reading rays through the system.

The collimating lens 22 is positioned directly in front of mirror 18 and in optical alignment therewith. This lens comprises a cemented doublet having a focal length of 325 mm. It directs the light received from mirror 18 onto the lens 24 which is mounted on a bridge 130 extending between the side walls 116 and on 18. As best seen in FIG. 6, the mirror 24 is centered somewhat below the optical axis 132 of the lens 22 and it is tilted with respect to this axis to insure that light rays incident on it from the lens return along a path that clears (lies below) the bottom wall 114 on which the lens is mounted; this is best seen in FIG. 6. The purpose of the mirror 24 is to further reduce the physical size of the scanner while maintaining a long effective optical path. Where the additional fold introduced by this mirror is not necessary, it can, of course, be omitted.

Positioned below the wall 114 is the spherical mirror 26 comprising an elongated mirror strip having a large radius of curvature (1016mm) is a plane containing its longitudinal (long) axis. The mirror 16, is decentered from the optical axis 119 (see FIG. 6) and slightly tilted to it to insure that light rays impinging on it from the mirror 24 clear (pass below) the mirror 24 on reflection from the mirror 16 onto the document 28. The focal length of the mirror 26 is 508mm (one-half the radius of curvature). This mirror introduces a negative curvature comparable in magnitude to the positive curvature introduced by the lens 22 to thereby provide an essentially flat field at the focal surface corresponding to the combination of the lens 22 and mirror 24. For the values given, the effective focal length is 250mm and the document is positioned such that its scan line lies in the focal surface of the lens and mirror combination. Further, it helps increase the effective focal length obtainable with the system. As a result, the beam impinges essentially perpendicular to the document in the horizontal plane (the plane containing the scan line) during scanning (the angle varying ±6.5° from the normal) and this greatly reduces the undesired modulation caused by variation of the spot size with beam impingement angle.

As noted from FIG. 6, the spherical mirror is necessarily decentered and tilted with respect to the optical axis 132. This would normally cause noticeable bow in the scan line and would thus affect copy quality on reproduction. This bow is esstentially eliminated in the present case, however, by the tilt of the illuminating beam which is projected onto the scan mirror 18. The necessary correcting tilt may, of course, also be obtained by tilting the scan axis of the mirror 18 so that it lies at an acute angle to the optical axis 119, instead of normal to it. In such a case, the entering illumination would strike at an acute angle to the scan axis, instead of normal to it.

The drawing of FIG. 6 is essentially to scale and shows the orientation of the components in the present embodiment. As seen therein, the optical axis 119, if extended from the lens 22 directly to the document 28, would make an angle of approximately 67° with the document 28. The normal to the mirror 24 makes an angle of approximately 80° to the document, while the normal to the mirror 26 makes an angle of approximately 85° to this document. The surface of the document 28, of course, is the focal point of the illuminating beam. The central ray of the illuminating cone makes an angle of approximately 78° with the document as measured in a vertical plane (the plane of FIG. 6). A scan spot size of 5 mils (0.005) inches was obtained and the diameter of the reading beam was further reduced by focusing it on a pinhole 70 (FIG. 1) that was 1.7 mils in diameter. The optics are f/8, on the illuminating beam and f/12.5 on the reading beam.

CONCLUSION

From the foregoing, it will be seen that we have provided an improved optical scanner. The scanner has essentially flat field and a very long focal length. The latter property minimizes intensity changes of the return beam due to geometric factors in scanning, and additionally greatly simplfies the scanning drive system by allowing use of a linear scan rate for the scan mirror.

The bow that would normally be introduced by decentering and tilting the spherical mirror to obtain the necessary clearance is essentially eliminated by the simple expedient of tilting the beam which illuminates the scan mirror. Further, this also essentially eliminates undesirable reflections of the illumination from the collimating lens.

Astigmatic defects in the reading beam are greatly reduced by transmitting only the central portion of this beam to the photomultiplier which generates the electrical signals corresponding to the information on the document being read. This allows the use of a cheaper collimating lens than would otherwise be used for a given resolution quality.

Specular reflection from the document is avoided by illuminating the document at an angle off its normal; thus, these reflections are precluded from returning through the system. Finally, the utilization of common major optical elements for both illuminating and reading the document contributes to an efficient and economic system.

It will be clear to those skilled in the art that various exchanges may be made in the foregoing embodiment of the invention without departing from either the spirit or the scope thereof, and it is intended that the foregoing be taken as illustrative only and not in limiting sense, the scope of the invention being defined with particularity in the claims.

Having illustrated and described our invention, we claim:

1. A folded optical scanner having a relatively bow-free scan line, comprising
    a light source,
    a focusing lens,
    a plane mirror positioned to receive light rays, from said source, which pass through said lens,
    a spherical mirror positioned to receive light rays from said plane mirror, said spherical mirror being tilted with respect to a straight-line optical axis between it and said plane mirror, said spherical mirror focusing said rays onto a document being scanned,
    said focusing lens and said spherical mirror having opposite optical characteristics so that said rays which focus on said document maintain a flat field at the focus, and
    a plane mirror pivoted for rotation about a scan axis and oriented to reflect incident light rays onto said lens along curved paths on the surface of said lens as it pivots on said scan axis.

2. A scanner according to claim 1 in which said light source is positioned to transmit a collimated beam of light onto said spherical mirror at an acute angle to said scan axis and in which said scan axis is positioned orthogonal to said lens.

3. A scanner according to claim 2 in which said light source directs said light rays onto said plane mirror at an angle between 80° and 88° to the mirror's scan axis.

4. A scanner according to claim 3 in which said light source directs said light rays onto said plane mirror at an angle of 85° to the mirror's scan axis.

5. A scanner according to claim 1 which includes
    1. a source of collimated light,
    2. a photosensitive element,
    3. a beam splitter positioned to receive light from said light source and direct it onto said scan mirror for scanning a document and to receive light reflected from said scan mirror after returning from said document and to direct it onto said photosensitive element photomultiplier.

6. A scanner according to claim 5 in which said light source and said photosensitive element are positioned to have second and third optical axes, respectively, orthogonal to each other, and in which said beam splitter comprises a plane mirror oriented midway between said second and third axes and having an outer reflecting periphery surrounding an inner central aperture, light from said source being directed onto said scan mirror by said outer periphery and light from said scan mirror passing to said photosensitive element through said aperture.

7. A scanner according to claim 6 which includes a second photosensitive element aligned with said light source and said aperture and providing an output indicative of the receipt of illumination from said source.

8. A scanner according to claim 1 in which said document is oriented at an acute angle to the illuminating beam incident on it to thereby eliminate zero order specular reflections from the incident beam.

9. A scanner according to claim 8 in which said splitter aperture presents a circular cross section to said light source and said photosensitive element and transmits to said photosensitive element approximately 50 percent of the illumination incident thereon.

10. A folded optical scanner having a reading beam of reduced astigmation, comprising, A. a collimated light source projecting light along a first optical axis,
B. a photosensitive element receiving light along a second optical axis disposed at an angle to said first axis,
C. a beam splitter comprising a plane mirror lying in a plane bisecting the angle between said first and second optical axes, said mirror having an outer reflecting periphery defining an inner aperture and oriented to receive light from a light source,
D. a scan mirror positioned to receive light from said mirror periphery and project it onto a document and to receive light reflected from said document and project it onto said photosensitive element through said aperture.

11. A scanner according to claim 10 in which said outer periphery defines an aperture that is essentially elliptical in the plane of said mirror and which presents an approximately spherical cross section to said photosensitive element and said light source.

12. A scanner according to claim 11 in which said aperture comprises approximately 50 percent of the useful surface of the beam splitter whereby 50 percent of the light incident on said mirror passes through said aperture and the remaining 50 percent is reflected therefrom.

13. A folded optical scanner having a relatively bow-free scan line comprising
a light source producing light rays,
a focusing lens having a first curvature and a spherical mirror having the opposite curvature so that an essentially flat field is provided at the focal surface,
said spherical mirror being tilted with respect to a straight-line optical axis passing through said lens, said spherical mirror also being positioned to receive said light rays from said lens and focusing said light rays onto a document being scanned, and
a plane mirror pivoted for rotation about a scan axis and oriented to reflect incident light rays onto said lens along curved paths on the surface of said lens as it pivots on said scan axis.

14. The apparatus defined in claim 13 and including a photomultiplier and a beam splitter, said beam splitter being positioned: (1) to receive light from said light source and direct it onto said scan mirror for scanning a document, (2) to receive light reflected from said scan mirror after returning from said document, and (3) to direct said light onto said photomultiplier.

15. The apparatus defined in claim 14 wherein said beam splitter is an apertured lens which transmits through its aperture only the central portion of the beam which is incident thereon.

16. The apparatus defined in claim 15 wherein the central aperture of the beam splitter is elliptical in shape whereby, when viewed along the optical axis of the illuminating beam, said aperture appears to be circular.

* * * * *